July 30, 1940.  O. HOLMES  2,209,731

WEED DESTROYER

Filed March 16, 1939

Inventor
OSCAR HOLMES
by Charles Orville Attys.

Patented July 30, 1940

2,209,731

UNITED STATES PATENT OFFICE 2,209,731

WEED DESTROYER

Oscar Holmes, Aurora, Ill.

Application March 16, 1939, Serial No. 262,107

6 Claims. (Cl. 47—49)

This invention relates to a simple and practical type of effective weed killer, preferably in the form of a cane, which is constructed to carry a weed killing liquid, predetermined quantities of which are adapted to be injected into a wound produced in the center or heart of a common weed such as dandelion, thistle, plantain and burdock, said wound being produced by means of a cutter carried by the cane and movable during a cutting operation to open a control valve for the purpose of causing the weed destroyer cane to discharge a required amount of the killing fluid into the weed wound, resulting in the almost instant killing of the weed.

It is an object of this invention to provide an improved type of weed destroyer implement in the form of a hollow liquid carrying cane including a combination wound producer and control valve operable during a wound producing operation to permit a predetermined number of drops of the killing liquid to be discharged from the cane into the cut or wound produced in the heart of the weed which is to be destroyed.

It is also an object of this invention to provide a simple and practical type of weed killer, in the form of a liquid carrying cane provided with an improved base or arched foot which will prevent clogging of the liquid discharge passage of the device.

It is a further object of this invention to provide an improved effective type of weed killer for crown type of weeds wherein the operating end of the device includes a combination wound producer and liquid projecting unit for causing rapid destruction of weeds which are treated.

It is an important object of this invention to provide an improved and practical type of crown weed destroyer implement, in the form of a cane or the like which carries a weed destroying liquid which is adapted to be discharged in predetermined quantities into wounds produced by a combination valve and cutter unit which projects from the bottom of the implement through a non-clogging foot.

Other and further important objects of this invention will be apparent from the disclosures in the specification and the accompanying drawing.

The invention, in a preferred form, is illustrated in the drawing and hereinafter more fully described.

Figure 1:
Figure 1 is a vertical elevational view of an improved weed destroyer cane embodying the principles of this invention.

The improved weed destroyer implement is in the form of a cane comprising a tubular body 1 for carrying a weed destroying liquid 2. The upper open end of the liquid container or tubular housing 1 is closed by means of a removable rubber cap or head 3 the interior of which is ribbed or corrugated to provide a tight leak proof fit around the upper end of the body or housing 1. The cap 3 is formed of rubber or other suitable material and is provided with an air vent 4 to facilitate the discharge of a predetermined quantity of the weed destroying liquid when the weed destroying instrument is used.

The lower end of the liquid container or tubular housing 1 is closed by means of a removable base or foot 5 which is provided with an arched middle portion 6 having a conical recess 7 in the bottom thereof. Integrally formed at substantially right angles to the top of the middle arched portion 6 of the foot is a stem or shank 8 formed with an axial liquid discharge passage 9, the lower end of which terminates in the conical recess 7 while the upper end terminates at the lower end of a conical valve seat 10. The upper end of the base shank 8 is slightly reduced in diameter and is exteriorly threaded for the removable reception of the threaded rim 11 of a conical cap 12 having a plurality of liquid outlet apertures 13 therein to permit the discharge of the weed destroying liquid 2 from the interior of the housing 1 into the shank portion of the foot of the instrument.

Figure 5:
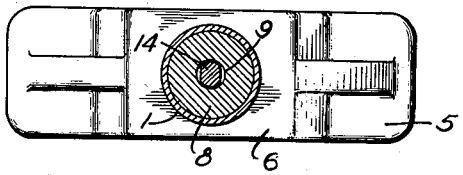
Figure 5 is a transverse detail section of the device taken on line V—V of Figure 2.

Projecting axially through the shank passage 9 of the foot member is a valve stem 14 which projects downwardly through the conical recess 7 and through the arched middle portion of the foot and terminates in a knife or cutter 15, which as clearly illustrated in Figures 1 to 3 inclusive, extends below the bottom surface of the foot 5 of the device. Formed on the upper end of the valve stem 14 is a valve 16 which normally is held seated upon the valve seat 10 by means of a valve spring 17 seated upon the top of the valve 16 and contained within the apertured cap 12. It will thus be noted that the coiled spring 17 normally acts to hold the valve 16 in closed position to prevent the discharge of the weed destroying liquid from the cane. For the purpose of determining the amount of weed destroying liquid which is discharged from the cane when the valve is open, the valve stem 14, as illustrated in Figure 5, is cut down or flattened on opposite sides to determine the size of the outet passage and the number of drops of liquid to be emitted from the foot of the cane and allowed to flow down over the projecting portion of the valve stem 14 and the cutter 15 into a wound or cut which is produced by inserting the cutter or knife 15 into the crown or heart of a crown weed such as a dandelion, a thistle, a plantain or a burdock to cause a rapid destruction of the treated weed when a predetermined amount of the killing liquid is projected or allowed to flow into the produced cut or wound in the heart of the weed.

Figure 2:
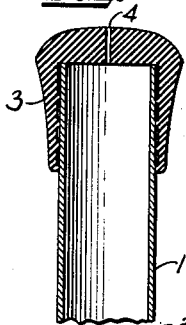
Figure 2 is an enlarged fragmentary longitudinal section through the weed destroyer, illustrating the combination wound producer and valve unit in elevation, with the valve unit in closed position.
Figure 3:
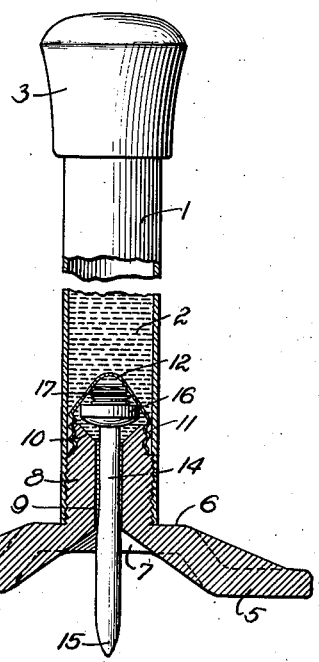
Figure 3 is an enlarged fragmentary part elevational and part sectional view taken through the device and illustrating the valve unit in open position during a wound producing operation of the cutter.
Figure 4:
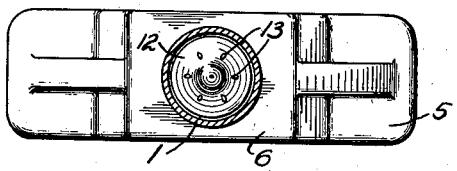
Figure 4 is a transverse detail section of the device taken on line IV—IV of Figure 2.

The discharge of the destroying liquid from the cane is occasioned when the cutter 15 is projected into the heart of the weed thereby causing the valve stem to slide upwardly from the position illustrated in Figure 2 into the open valve position of Figure 3 wherein the valve is raised from the valve seat and the control spring 17 is compressed. As soon as the cutter 15 is withdrawn from the weed the compressed spring automatically acts to close the valve and thereby shut off the discharge of the weed destroying liquid.

By forming the foot of the cane with an arched middle portion, clogging of the valve mechanism and the liquid passages of the cane is obviated.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A cane type weed destroyer comprising a tubular housing carrying a weed destroying liquid, a filler cap removably engaged on one end thereof and having an air vent therein, an arched and recessed foot closing the opposite end of the tubular housing, and a combination cutter and valve unit in the arched and recessed foot for cutting a wound in the heart of a weed and simultaneously causing opening of the valve for the discharge of a predetermined quantity of the liquid into the weed wound.

2. A weed destroyer comprising a housing containing a weed destroying liquid, an apertured closure cap on one end of said housing, an arched and recessed shoe for closing the opposite end of said housing, a passaged shank on said arched shoe projecting into the housing, a valve seat formed in the inner end of said shank, a valve on said valve seat, a spring seated on said valve, a valve stem on said valve projecting through the passaged shank and out through the recess in the bottom of said foot, said valve stem having the projecting end thereof shaped to form a cutter, and an aperture inner cap removably engaged on said shank and containing the spring.

3. A weed destroyer comprising a liquid carrying cane, a closure cap removably engaged on one end of the cane and having an air vent therein, an arched foot on the lower end of the cane, a passaged shank integrally formed on said arched foot and projecting into the lower end of the cane, a valve seat formed on the inner end of the shank, a valve on said valve seat, a valve stem integrally formed on the valve and projecting through the passaged shank beyond the bottom of said arched foot, said valve stem having the projecting end thereof shaped to form a weed cutter, an apertured top engaged on said shank over the valve and the valve seat, and means in said aperture top for normally holding the valve on the valve seat.

4. A weed destroyer comprising a hollow cane, an apertured outer closure cap on one end thereof, a closure base for the lower end of said cane, a weed destroying liquid in said cane, a weed wound cutter slidably projecting through said closure base, a valve on the inner end of said cutter, said closure base having a liquid passage therein through which the cutter projects and also having a valve seat for said valve, a valve seating spring seated on said valve for normally holding the valve on the valve seat and operable when the cutter is forced into a weed to cut a wound to simultaneously open the valve for the discharge of a predetermined quantity of the liquid from the cane into the weed wound, and an apertured inner cap secured to said closure base within the hollow cane to enclose the spring therein completely above said base.

5. A weed destroyer comprising a liquid carrying cane, an apertured cap removably engaged over the upper end of the cane to permit filling of the cane with a weed destroying liquid, an arched and recessed non-clogging foot on said cane to close the bottom thereof, and a spring controlled combination weed wound cutter and valve mechanism shiftably mounted in said foot and insertable into the crown of a weed to simultaneously cut a wound therein and deposit a selected number of drops of the weed destroying liquid from said cane in the weed wound.

6. A weed destroyer comprising a hollow cane containing a weed destroying liquid, an arched non-clogging foot closing the bottom of said cane, and a combination weed wound cutter and valve mechanism movably engaged in said foot and operable to cut a wound in the crown of a weed and deposit a quantity of the liquid into the weed wound to cause destruction of the treated weed.

OSCAR HOLMES.